United States Patent
Fukami

(10) Patent No.: US 11,354,079 B2
(45) Date of Patent: Jun. 7, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Dai Fukami, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 162 days.

(21) Appl. No.: 16/549,488

(22) Filed: Aug. 23, 2019

(65) Prior Publication Data
US 2020/0081674 A1 Mar. 12, 2020

(30) Foreign Application Priority Data
Sep. 6, 2018 (JP) .............................. JP2018-167000

(51) Int. Cl.
*G06F 3/12* (2006.01)

(52) U.S. Cl.
CPC .......... *G06F 3/1262* (2013.01); *G06F 3/1204* (2013.01); *G06F 3/1205* (2013.01); *G06F 3/1268* (2013.01)

(58) Field of Classification Search
CPC combination set(s) only.
See application file for complete search history.

(56) References Cited

U.S. PATENT DOCUMENTS

| | | | |
|---|---|---|---|
| 2005/0088709 A1* | 4/2005 | Kizaki | H04N 1/32539 358/501 |
| 2006/0139690 A1* | 6/2006 | Yagita | G06F 3/1286 358/1.15 |
| 2007/0035763 A1* | 2/2007 | Bard | G06Q 20/10 358/1.15 |
| 2010/0053664 A1* | 3/2010 | Mandel | G06F 3/124 358/1.15 |
| 2011/0164886 A1* | 7/2011 | Sawada | G03G 15/55 399/8 |
| 2011/0211888 A1* | 9/2011 | Fujinaga | B41J 13/0009 399/403 |
| 2012/0176645 A1* | 7/2012 | Saito | G06F 3/1204 358/1.15 |
| 2012/0250053 A1* | 10/2012 | Mitsubori | G06K 15/1806 358/1.13 |
| 2013/0250329 A1* | 9/2013 | Satoh | G06F 3/126 358/1.13 |

(Continued)

FOREIGN PATENT DOCUMENTS

| | | |
|---|---|---|
| JP | 2005-174122 A | 6/2005 |
| JP | 2006-004077 A | 1/2006 |

*Primary Examiner* — Helen Zong
(74) *Attorney, Agent, or Firm* — Oliff PLC

(57) ABSTRACT

An information processing apparatus includes a forming unit, a storage, and a selector. The forming unit receives print jobs and forms a group print job constituted by print jobs that satisfy a certain condition. The storage separately stores some of the print jobs forming the group print job as a subgroup if an amount of paper required for the group print job exceeds a total amount of specified continuous-form paper. Based on information stored in the storage, the selector selects, from among plural output devices, an output device that is able to output cut sheets which satisfy an execution condition for executing the print jobs forming the subgroup.

8 Claims, 13 Drawing Sheets

(56) References Cited

U.S. PATENT DOCUMENTS

| | | | |
|---|---|---|---|
| 2015/0002881 A1* | 1/2015 | Koike | G06F 3/121 |
| | | | 358/1.14 |
| 2016/0364193 A1* | 12/2016 | Yu | H04N 1/00347 |
| 2019/0034140 A1* | 1/2019 | Yamada | H04L 43/0817 |
| 2019/0129669 A1* | 5/2019 | Takahashi | H04N 1/00477 |
| 2019/0146733 A1* | 5/2019 | Park | G06F 3/12 |
| | | | 358/1.15 |
| 2019/0389221 A1* | 12/2019 | Ferreri | B41J 2/16585 |
| 2019/0391775 A1* | 12/2019 | Isobe | G06F 3/1232 |
| 2020/0081674 A1* | 3/2020 | Fukami | G06F 3/1235 |
| 2020/0387333 A1* | 12/2020 | Nakajima | G06F 3/126 |

* cited by examiner

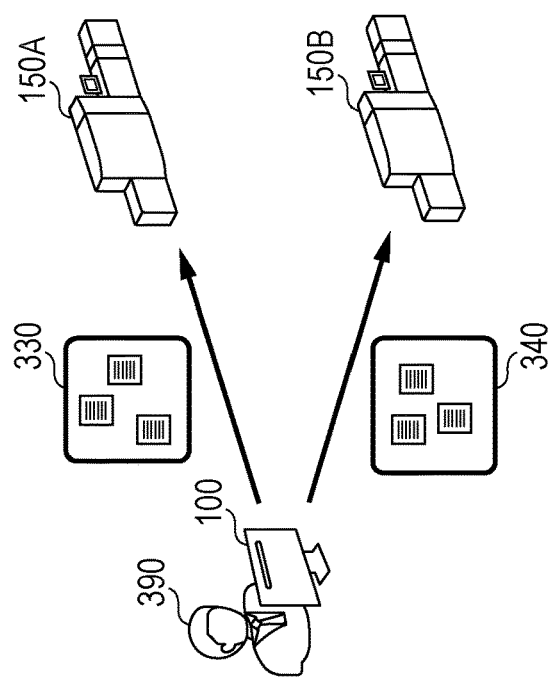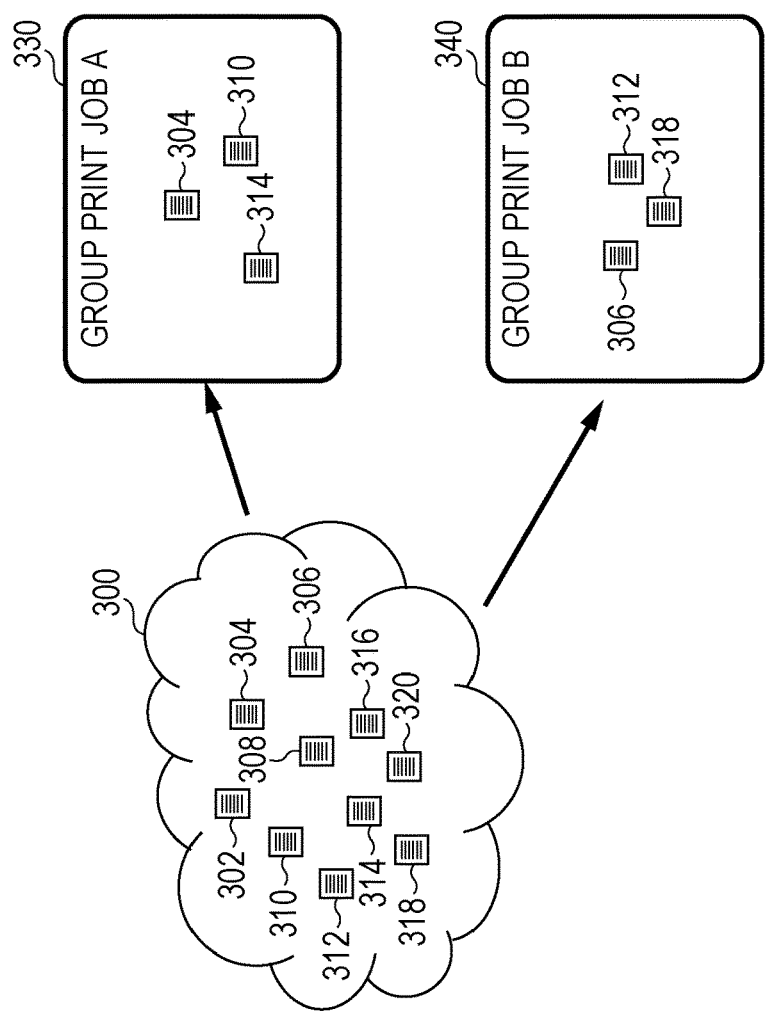

FIG. 4A

| | ID ▼ | PRINT JOB NAME | STATUS | NUMBER OF PRINT COPIES | SENDING DEVICE | DETAIL |
|---|---|---|---|---|---|---|
| ☐ | 10 | JOB 10 | WAITING | 1 | | ⊡ |
| ☐ | 9 | ▲ GROUP JOB A (FOUR JOBS) | WAITING | | | ⊡ |
| ☐ | 8 | ▲ GROUP JOB B (THREE JOBS) | WAITING | | | ⊡ |
| ☐ | 1 | JOB 1 | WAITING | 5 | | ⊡ |

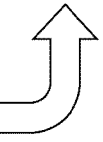

FIG. 4B

| | ID ▼ | PRINT JOB NAME | STATUS | NUMBER OF PRINT COPIES | SENDING DEVICE | DETAIL |
|---|---|---|---|---|---|---|
| ☐ | 10 | JOB 10 | WAITING | 1 | | ⊡ |
| ☐ | 9 | ▼ GROUP JOB A (FOUR JOBS) | WAITING | | | ⊡ |
| ☐ | 6 | JOB 6 | WAITING | 5 | | ⊡ |
| ☐ | 5 | JOB 5 | WAITING | 5 | | ⊡ |
| ☐ | 4 | JOB 4 | WAITING | 5 | | ⊡ |
| ☐ | 3 | JOB 3 | WAITING | | | ⊡ |
| ☐ | 8 | ▶ GROUP JOB B (THREE JOBS) | WAITING | 5 | | ⊡ |
| ☐ | 7 | JOB 7 | WAITING | | | ⊡ |
| ☐ | 11 | ▲ GROUP JOB C (TWO JOBS) | WAITING | | | ⊡ |
| ☐ | 1 | JOB 1 | WAITING | 5 | | ⊡ |

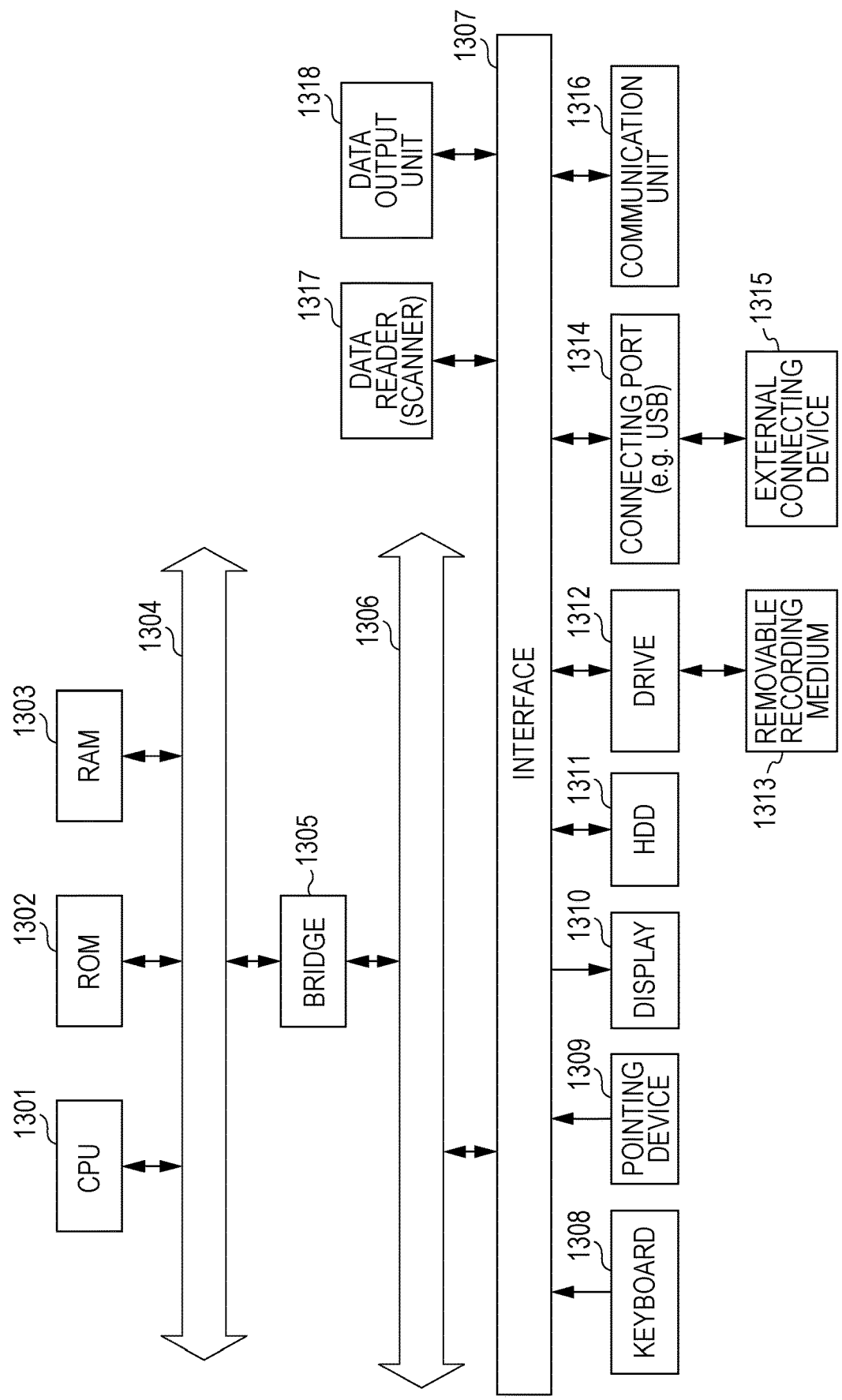

… (1) …

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-167000 filed Sep. 6, 2018.

BACKGROUND

(i) Technical Field

The present disclosure relates to an information processing apparatus and a non-transitory computer readable medium.

(ii) Related Art

Japanese Unexamined Patent Application Publication No. 2006-004077 discloses the following technology to implement a print job grouping function with a simple configuration even in an environment without a print server or in a print system environment without a print job grouping function in a printer driver or a printer device. In a print system including an information processing apparatus and an image forming device, the information processing apparatus performs the following print-job transfer control method. The print-job transfer control method includes: receiving plural print jobs based on application data; grouping the plural print jobs together and managing them as a group job; and performing control so that the plural print jobs (print job data) are transferred to the image forming device in one session by using a predetermined print protocol after they have been spooled.

Japanese Unexamined Patent Application Publication No. 2005-174122 discloses the following technology to group plural print jobs together with a simple configuration. A computer is caused to perform a print-job transfer control method so that plural items of print job data are grouped together and are managed as a group job and the group job is transferred to a printer device in one session by using a predetermined print protocol.

SUMMARY

The following technology has been proposed. Print jobs that satisfy a certain condition are grouped together as a group print job, and a suitable printer for the group print job is selected from among plural printers and is instructed to print in accordance with the group print job. Examples of the condition for grouping plural print jobs together are the volume of paper, length, number of pages, and number of jobs.

In this case, a certain condition is specified for storing print jobs as a group print job so that the group print job can be printed and contained within selected continuous-form paper. Without such a condition, if a printer runs out of the selected continuous-form paper, it fails to complete the execution of the group print job.

Aspects of non-limiting embodiments of the present disclosure relate to an information processing apparatus and a non-transitory computer readable medium in which the execution of a group print job is not interrupted due to a shortage of selected continuous-form paper, even without specifying a condition for storing print jobs as a group print job so that the group print job can be printed and contained within the selected continuous-form paper.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a forming unit, a storage, and a selector. The forming unit receives print jobs and forms a group print job constituted by print jobs that satisfy a certain condition. The storage separately stores some of the print jobs forming the group print job as a subgroup if an amount of paper required for the group print job exceeds a total amount of specified continuous-form paper. Based on information stored in the storage, the selector selects, from among plural output devices, an output device that is able to output cut sheets which satisfy an execution condition for executing the print jobs forming the subgroup.

BRIEF DESCRIPTION OF THE DRAWINGS

An exemplary embodiment of the present disclosure will be described in detail based on the following figures, wherein:

FIGS. 3A and 3B schematically illustrate a usage example of the exemplary embodiment;

FIGS. 4A and 4B illustrate display examples of a screen according to the exemplary embodiment;

FIG. 13 is a block diagram illustrating an example of the hardware configuration of a computer implementing the exemplary embodiment.

DETAILED DESCRIPTION

An exemplary embodiment of the disclosure will be described below with reference to the accompanying drawings.

Figure 1:
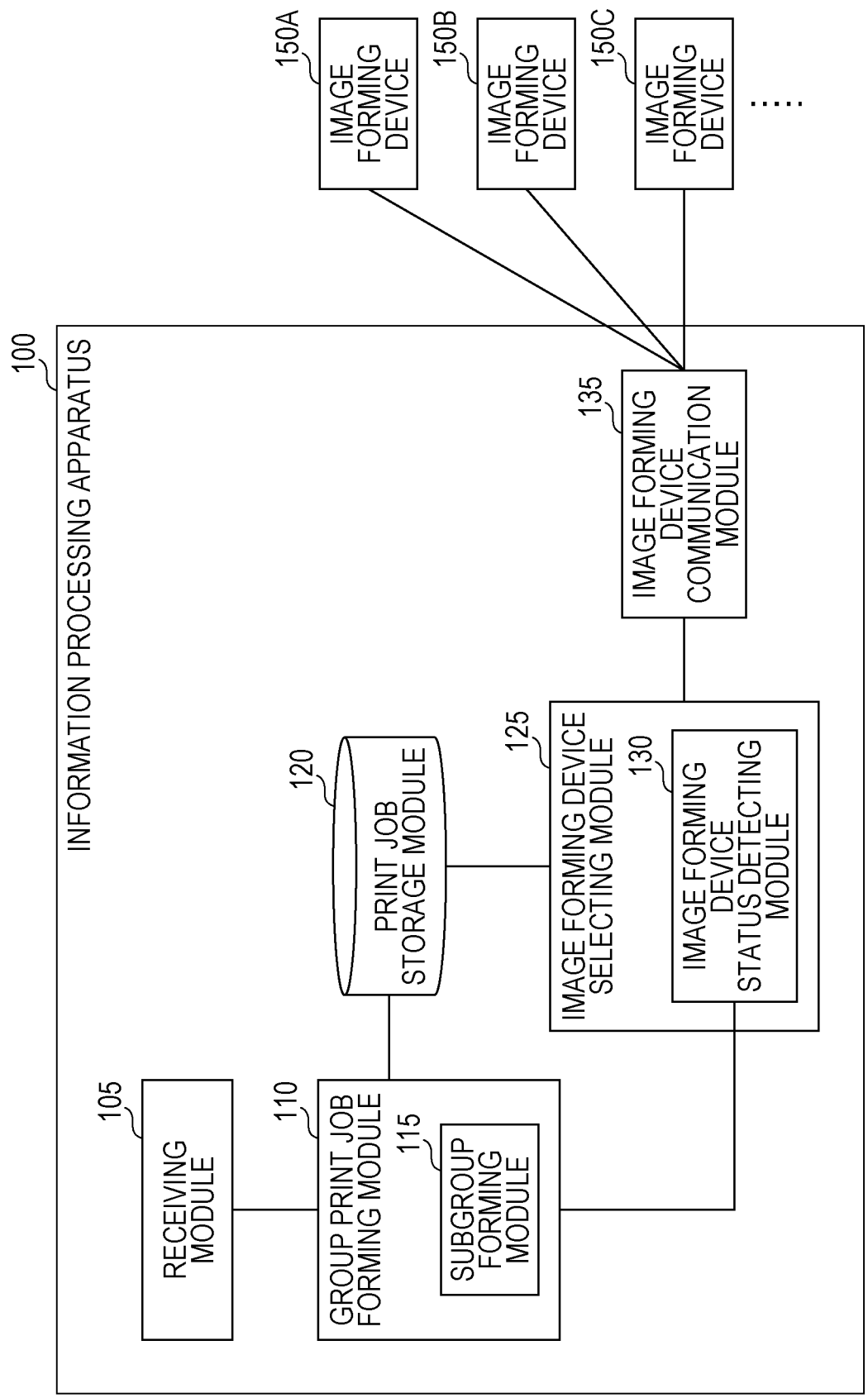
FIG. 1 is a block diagram illustrating conceptual modules forming an example of the configuration of the exemplary embodiment.

FIG. 1 is a block diagram illustrating conceptual modules forming an example of the configuration of the exemplary embodiment.

Generally, modules are software (computer programs) components or hardware components that can be logically separated from one another. The modules of the exemplary embodiment of the disclosure are, not only modules of a computer program, but also modules of a hardware configuration. Thus, the exemplary embodiment will also be described in the form of a computer program for allowing a computer to function as those modules (a program for causing a computer to execute program steps, a program for allowing a computer to function as corresponding units, or a computer program for allowing a computer to implement corresponding functions), a system, and a method. While expressions such as "store", "storing", "being stored", and equivalents thereof are used for the sake of description, such expressions indicate, when the exemplary embodiment relates to a computer program, storing the computer program in a storage device or performing control so that the computer program will be stored in a storage device. Modules may correspond to functions based on a one-to-one relationship. In terms of implementation, however, one module may be constituted by one program, or plural modules may be constituted by one program. Conversely, one module may be constituted by plural programs. Additionally, plural modules may be executed by using a single computer, or one module may be executed by using plural computers in a distributed or parallel environment. One module may integrate another module therein. Hereinafter, the term "connection" includes not only physical connection, but also logical connection (sending and receiving of data, giving instructions, reference relationships among data elements, login, etc.). The term "predetermined" means being determined prior to a certain operation, and includes the meaning of being determined prior to a certain operation before starting processing of the exemplary embodiment, and also includes the meaning of being determined prior to a certain operation even after starting processing of the exemplary embodiment, in accordance with the current situation/state or in accordance with the previous situation/state. If there are plural "predetermined values", they may be different values, or two or more of the values (or all the values) may be the same. A description having the meaning "in the case of A, B is performed" is used as the meaning "it is determined whether the case A is satisfied, and B is performed if it is determined that the case A is satisfied", unless such a determination is unnecessary. If elements are enumerated, such as "A, B, and C", they are only examples unless otherwise stated, and such enumeration includes the meaning that only one of them (only the element A, for example) is selected.

A system or an apparatus may be implemented by connecting plural computers, hardware units, devices, etc., to one another via a communication medium, such as a network (including communication connection based on a one-to-one correspondence), or may be implemented by a single computer, hardware unit, device, etc. The terms "apparatus" and "system" are used synonymously. The term "system" does not include merely a man-made social "mechanism" (social system).

Additionally, every time an operation is performed by using a corresponding module or every time each of plural operations is performed by using a corresponding module, target information is read from a storage device, and after performing the operation, a processing result is written into the storage device. A description of reading from the storage device before an operation or writing into the storage device after an operation may be omitted. Examples of the storage device may be a hard disk drive, a random access memory (RAM), an external storage medium, a storage device using a communication line, and a register within a central processing unit (CPU).

An information processing apparatus 100 according to the exemplary embodiment receives a print job, selects an image forming device 150 suitable for the print job, and sends the print job to this image forming device 150. As shown in the example in FIG. 1, the information processing apparatus 100 includes a receiving module 105, a group print job forming module 110, a print job storage module 120, an image forming device selecting module 125, and an image forming device communication module 135.

An example of the image forming devices 150 is a production printer. The production printer performs light printing for in-house printing departments of companies and print stores, and usually offers mass printing. The image forming devices 150 are not restricted to production printers, and may be general-purpose printers, such as business printers and home printers.

Hereinafter, when referring to the image forming devices 150 in general, they may collectively be called the image forming device 150 unless it is necessary to individually distinguish them from each other.

The image forming device 150 may not be necessarily able to handle a group print job constituted by multiple print jobs. Even if the image forming device 150 does not support a group print job, that is, even if it handles only a single print job, it can still handle a group print job if the information processing apparatus 100 sends print jobs forming a group print job to the image forming device 150 in accordance with the print order of the group print job. That is, it is possible to handle a group print job by using both of the information processing apparatus 100 and the image forming device 150.

The image forming devices 150 include an output device for continuous-form paper and may also include an output device for cut sheets. Examples of the continuous-form paper are roll paper, line printer (LP) paper, and continuous paper. The cut sheets are sheets cut into a standard size (such as A4, A3, B4, and B5 sizes). The output device for cut sheets of a certain size thus includes feeders for cut sheets of this size (such as a sheet feeder, a sheet feeder tray, a sheet tray, a sheet feeder cassette, and a deck).

The receiving module 105 is connected to the group print job forming module 110. The receiving module 105 receives a print job and supplies it to the group print job forming module 110. The print job includes a document to be printed and attribute information concerning the document.

The group print job forming module 110 includes a subgroup forming module 115 and is connected to the receiving module 105, the print job storage module 120, and an image forming device status detecting module 130 of the image forming device selecting module 125. The group print job forming module 110 selects print jobs which satisfy a certain condition from among plural print jobs received by the receiving module 105 and forms a group print job constituted by the selected print jobs. The group print job forming module 110 may form a group print job by using a known technique, such as according to the sheet size.

If the amount of paper required for a group print job formed by the group print job forming module 110 exceeds the total amount of specified continuous-form paper, the subgroup forming module 115 separates some of the print jobs forming the group print job as a subgroup. As the continuous-form paper, continuous-form paper set in a selected image forming device 150 may be used, instead of specifying continuous-form paper.

The subgroup forming module 115 may separate some of the print jobs forming a group print job as a subgroup in accordance with the attributes of cut sheets that a cut-sheet image forming device 150 is able to output.

More specifically, the subgroup forming module 115 forms a subgroup, not only in accordance with the remaining amount of paper to be printed, but also in accordance with the attributes of cut sheets which compensate for a shortage of paper that a cut-sheet output device is able to output.

Examples of the attributes of cut sheets are the sheet type (such as the material, thickness, and color) and the sheet size.

The cut sheets that an image forming device 150 is able to output are those that the image forming device 150 is able to currently output, and more specifically, those that can be currently output from the sheet feeder of this image forming device 150. However, even if the sheet feeder of the image forming device 150 is unable to output cut sheets, if it is replaced by another sheet feeder that can output cut sheets, such an image forming device 150 may be an option.

In particular, the cut sheets that an image forming device 150 is able to output may be those that are currently stored in the image forming device 150.

The subgroup forming module 115 may separate some of the print jobs forming a group print job as a subgroup in accordance with the remaining amount of continuous-form paper stored in a continuous-form-paper image forming device 150.

The print job storage module 120 is connected to the group print job forming module 110 and the image forming device selecting module 125. The print job storage module 120 stores print jobs received by the group print job forming module 110, group print jobs formed by the group print job forming module 110, and subgroup print jobs formed by the subgroup forming module 115. If the amount of paper required for a group print job formed by the group print job forming module 110 exceeds the total amount of specified continuous-form paper, the print job storage module 120 stores some of the print jobs forming the group print job as a subgroup, separately from the rest of the print jobs.

The print job storage module 120 may store some of the print jobs forming a group print job as a subgroup in accordance with the attributes of cut sheets that a cut-sheet image forming device 150 is able to output.

The print job storage module 120 may store some of the print jobs forming a group print job as a subgroup in accordance with the remaining amount of continuous-form paper stored in a continuous-form-paper image forming device 150.

The image forming device selecting module 125 includes the image forming device status detecting module 130, and is connected to the print job storage module 120. The image forming device selecting module 125 selects, from among plural image forming devices 150 connected to the information processing apparatus 100, an image forming device 150 that prints in accordance with a print job, a group print job, or a subgroup print job stored in the print job storage module 120.

Based on information stored in the print job storage module 120, the image forming device selecting module 125 selects, from among the plural image forming devices 150, an image forming device 150 that outputs cut sheets which satisfy an execution condition for executing the print jobs forming a subgroup print job. In this case, image forming devices 150 to be selected are an image forming device 150 that outputs continuous-form paper and an image forming device 150 (may be plural image forming devices 150) that outputs cut sheets.

Examples of the execution condition are the sheet type (such as the material, thickness, and color) and the sheet size. The image forming device 150 that outputs sheets satisfying such an execution condition is selected. Concerning the sheet size, sheets having a size larger than the required size may be used if it is possible to cut such sheets into the required size after they are printed. However, an image forming device 150 that can only output cut sheets smaller than the required size is not selected.

Based on information stored in the print job storage module 120, the image forming device selecting module 125 may select, from among the plural image forming devices 150, an image forming device 150 that outputs continuous-form paper which satisfies an execution condition for executing the print jobs forming a subgroup print job. In this case, image forming devices 150 to be selected are an image forming device 150 that outputs continuous-form paper and another image forming device 150 (may be plural image forming devices 150) that outputs continuous-form paper.

The image forming device selecting module 125 may preferentially select an image forming device 150 that satisfies conditions that the amount of paper stored in this image forming device 150 is greater than or equal to the remaining amount of paper stored in another image forming device 150 to be used for printing and that the difference between the amount of paper stored in this image forming device 150 and the remaining amount of paper in another image forming device 150 is smaller than or equal to a threshold.

If the image forming device selecting module 125 has failed to find an image forming device 150 that satisfies the above-described conditions, it may display the volume of print jobs ordered by each client and the amount of paper stored in each image forming device 150 and instruct a user to select an image forming device 150.

That is, if continuous-form paper stored in an image forming device 150 is not likely to be used up, a user is instructed to select an image forming device 150 by itself. To instruct a user to select an image forming device 150 according to the client, it is necessary to identify the volume of print jobs ordered by each client and the amount of paper set in each image forming device 150. With this approach, however, an image forming device 150 can be assigned to print jobs according to the client, thereby making it possible to perform postprocessing according to the client.

The image forming device selecting module 125 may apply a predetermined rule to a group print job or a subgroup print job and select an image forming device 150 that prints in accordance with the group print job or the subgroup print job. Regarding a print job which does not form a group print job or a subgroup print job, an image forming device 150 specified in this print job or a predetermined image forming device 150 may be selected.

The predetermined rule may be a condition based on the attributes of print jobs forming a group print job or a subgroup print job. According to this rule, the image forming device 150 is selected substantially based on a static condition.

The image forming device selecting module 125 may select an image forming device 150 that matches the attributes of print jobs forming a group print job. For example, the image forming device selecting module 125 may select an image forming device 150 that matches all the attributes of all the print jobs forming a group print job.

The predetermined rule may be a condition that the image forming device 150 be able to finish print jobs forming a group print job or a subgroup print job. According to this rule, the image forming device 150 is selected substantially based on a dynamic condition (the current status of the image forming device 150).

The image forming device selecting module 125 may detect the status of each image forming device 150 and select an image forming device 150 that is able to finish printing print jobs forming a group print job. For example, the image forming device selecting module 125 may select an image forming device 150 that is able to finish printing all the print jobs forming a group print job.

The predetermined rule may be a condition that an image forming device 150 be able to print a predetermined print job forming a group print job.

The predetermined print job may be the print job at the head of the group print job or a print job selected by a user.

In this case, the user may prioritize print jobs to select a print job. The user may only provide the highest priority to one print job or provide priority to all print jobs. The user may alternatively provide a predetermined number of priorities (such as providing the highest and the second highest priorities). The user may select the print job of the highest priority or print jobs of up to the three highest priorities.

The predetermined rule may be, as a condition, the date and time on and at which print jobs forming a group print job will be finished.

The image forming device selecting module 125 may detect the status of an image forming device 150 and estimate the date and time on and at which the image forming device 150 is likely to finish printing.

The image forming device status detecting module 130 is connected to the group print job forming module 110. The image forming device status detecting module 130 detects the status of each image forming device 150 connected to the information processing apparatus 100 via the image forming device communication module 135. An example of the status of the image forming device 150 is attributes of the image forming device 150 (such as a paper type (continuous-form paper or cut sheets) and print speed). Another example of the status is the status of the image forming device 150. Examples of the status of the image forming device 150 are the amount of paper or the number of sheets currently stored in the image forming device 150, the remaining amount of toner, the status of consumables, such as toner and paper or sheets (remaining amount of paper or remaining number of sheets, rate of use, and expected time of reload, refill or replacement of consumables). Another example of the status of the image forming device 150 is whether it is printing, waiting, or not functioning. If the image forming device 150 is printing, the scheduled end time of printing may be included as the status.

The image forming device communication module 135 is connected to the image forming device selecting module 125 and the image forming devices 150 (such as image forming devices 150A, 150B, and 150C). The image forming device communication module 135 supplies a print job, a group print job, or a subgroup print job to the image forming device 150 selected by the image forming device selecting module 125. The image forming device communication module 135 also receives a result of detecting the status of each image forming device 150 from the image forming device 150 and supplies the result to the image forming device status detecting module 130.

The image forming devices 150 (such as the image forming devices 150A, 150B, and 150C) are connected to the image forming device communication module 135 of the information processing apparatus 100. The image forming device 150 receives a print job, a group print job, or a subgroup print job from the information processing apparatus 100 and performs print processing in accordance with the received print job, group print job, or subgroup print job.

Although three image forming devices 150 are connected to the information processing apparatus 100 in the example in FIG. 1, any plural image forming devices 150 may be connected.

Figure 2A:
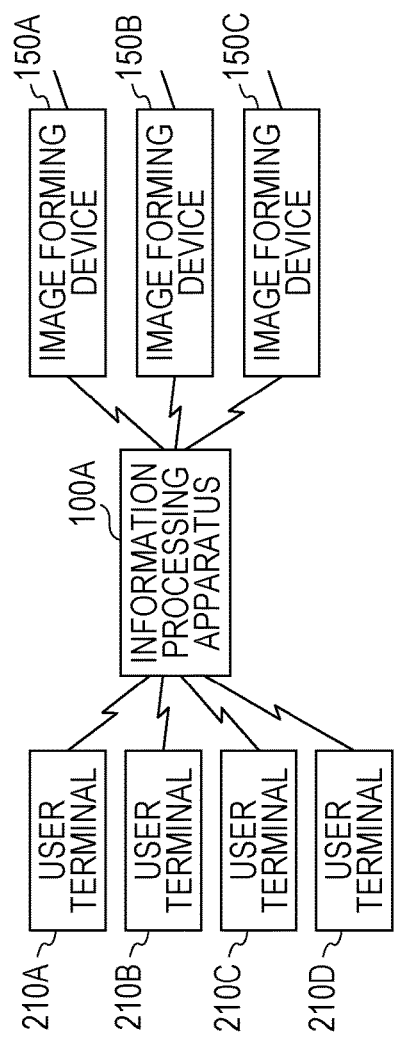
FIGS. 2A and 2B illustrate examples of the system configuration utilizing the exemplary embodiment.
Figure 2B:
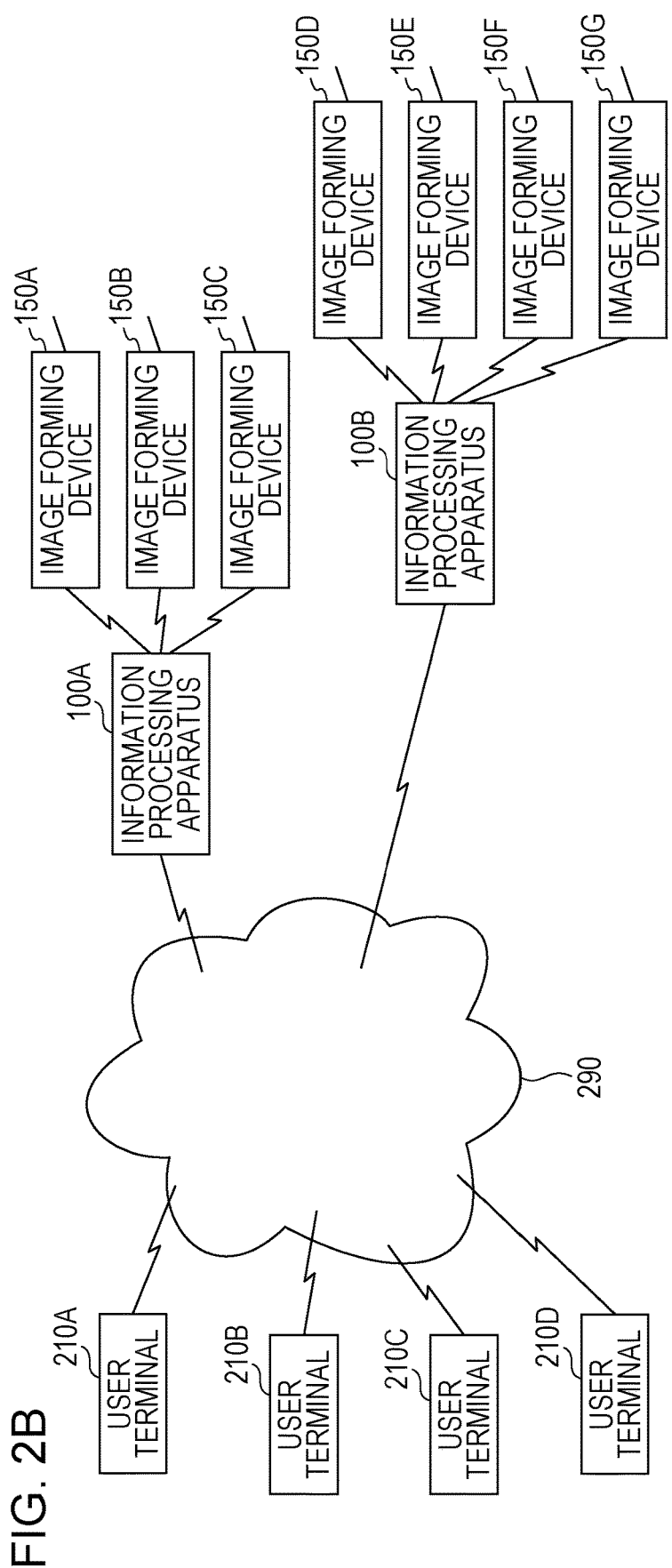

FIGS. 2A and 2B illustrate examples of the system configuration utilizing the exemplary embodiment.

The information processing apparatus 100 may be included within an external controller of the image forming device 150.

In the example shown in FIG. 2A, an information processing apparatus 100A is connected to user terminals 210 (user terminals 210A through 210D) and image forming devices 150 (image forming devices 150A through 150C).

Hereinafter, when referring to the user terminals 210 in general, they may collectively be called the user terminal 210 unless it is necessary to individually distinguish them from each other.

The information processing apparatus 100A receives a print job, a group print job, or a subgroup print job from the user terminal 210 and supplies it to the image forming device 150 suitable for the received print job, group print job, or subgroup print job. The image forming device 150 performs print processing in accordance with the received print job, group print job, or subgroup print job.

In the example in FIG. 2B, information processing apparatuses 100A and 100B and user terminals 210A through 210D are connected to each other via a communication line 290. The communication line 290 may be a wireless or wired medium, or a combination thereof, and may be, for example, the Internet or an intranet as a communication infrastructure. The functions of the information processing apparatuses 100A and 100B may be implemented as cloud services.

The information processing apparatus 100A is connected to image forming devices 150A through 150C.

The information processing apparatus 100B is connected to image forming devices 150D through 150G.

Hereinafter, when referring to the information processing apparatuses 100 in general, they may collectively be called the information processing apparatus 100 unless it is necessary to individually distinguish them from each other.

The information processing apparatus 100 receives a print job, a group print job, or a subgroup print job from the user terminal 210 via the communication line 290 and supplies it to the image forming device 150 suitable for the received print job, group print job, or subgroup print job. The image forming device 150 performs print processing in accordance with the received print job, group print job, or subgroup print job.

FIGS. 3A and 3B schematically illustrate a usage example of the exemplary embodiment. Group print jobs will be discussed in greater detail.

A group print job is constituted by plural print jobs. That is, a group print job is a unit of some print jobs and is like a box in which plural print jobs are stored. A group print job does not have print data or print settings, and each of the print jobs forming the group print job has print data and print settings.

For example, some print jobs are grouped together for a certain reason which is convenient for a user, such as the paper type used in printing is the same, and print jobs formed into a group print job are executed at one time. That is, the group print job is handled as if it were a single print job.

Information collected from all print jobs forming a group print job (such as the total number of sheets to be printed) may be used when allocating the print jobs to plural image forming devices 150.

A print job group 300 includes print jobs 302 through 320. Among these print jobs 302 through 320, some print jobs may be grouped together, as stated above. For example, the print jobs 304, 310, and 314 may be grouped together to form a group print job A 330, and the print jobs 306, 312, and 318 may be grouped together to form a group print job B 340.

As a result of a user 390 performing an operation, the information processing apparatus 100 may be able to send a print job or temporarily stop sending a print job to the image forming device 150, and may also instruct the image forming device 150 to perform test printing, restart printing, or cancel printing.

If a certain type of paper A is set as print paper in the group print job A 330, the information processing apparatus 100 selects the image forming device 150A in which the paper A is already set (or "stock X is set"), and sends the group print job A 330 to the image forming device 150A.

If the total number of pages to be printed in the group print job B 340 is 3000 pages, the information processing apparatus 100 selects the image forming device 150B that can print all 3000 pages without any user intervention during printing (without removing printed sheets from a printed sheet receiver, for example), and sends the group print job B 340 to the image forming device 150B. In this case, it is assumed that the printed sheet receiver of the image forming device 150B is capable of receiving 3000 pages or more.

A subgroup print job is a print job group constituted by print jobs divided from a group print job. The information processing apparatus 100 selects an image forming device 150 for each subgroup print job.

Generating of a group print job in accordance with the print job management method employed by a user implements the following operations.

(A) Plural print jobs ordered by a client can be handled together.

(B) To make operations efficient for the convenience of an operator in charge of printing, print jobs stored in a spooler can be grouped together according to the output sheet type, the required postprocessing (such as punching and stapling), the operator in charge of printing, or the date and time on and at which printing is performed.

(C) To make operations efficient in accordance with the resources (stored amounts of paper and toner) of the image forming device 150, print jobs stored in a spooler can be grouped together according to the amount of paper that can be output from the image forming device 150 or the remaining amount of ink or toner that can be output from the image forming device 150.

FIGS. 4A and 4B illustrate display examples of a screen 400 according to the exemplary embodiment. More specifically, FIGS. 4A and 4B illustrate display examples of group print jobs and print jobs in the information processing apparatus 100.

In FIG. 4A, a print job 410 is displayed on the screen 400. The print job 410 has a check field 412, an ID field 414, a print job name field 416, a status field 418, a number-of-print-copies field 420, a sending device field 422, and a detail field 424. A user can check a box in the check field 412 of a print job to be processed. The ID field 414 indicates ID information of a print job or a group print job. The print job name field 416 indicates the print job name of a print job or a group print job. The status field 418 indicates the current status of a print job or a group print job. The number-of-print-copies field 420 indicates the number of print copies in a print job or a group print job. The sending device field 422 indicates the device (image forming device 150) to which a print job or a group print job will be sent. The detail field 424 includes a button for displaying details of a print job or a group print job.

Operations (such as send, copy, delete, and store/cancel) except for editing and operations (such as print/restart, proof print, pause, and cancel) for a group print job are the same as those for a single print job (regular print job).

Concerning each of the operations for a group print job, it is determined whether and how the operation will be performed in accordance with the status of print jobs forming the group print job.

Concerning the print job 410 in the example in FIG. 4A, the first row indicates that ID is 10, the print job name is job 10, the status is waiting, the number of print copies is one, and the sending device is undetermined; the second row indicates that ID is 9, the print job name is group job A (four jobs), the status is waiting, the number of print copies is undetermined, and the sending device is undetermined; the third row indicates that ID is 8, the print job name is group job B (three jobs), the status is waiting, the number of print copies is undetermined, and the sending device is undetermined; and the fourth row indicates that ID is 1, the print job name is job 1, the status is waiting, the number of print copies is five, and the sending device is undetermined.

Group print job marks 432 and 434 are appended to the print job name field 416 of the second and third rows and indicate that these jobs are group print jobs. That is, icons (black triangle marks in FIG. 4A) indicating the open/closed state of a group print job are displayed at the head of the print job name field 416. As a result of a user selecting (clicking) the group print job mark 432 or 434, the open/closed state of the corresponding group print job is switched. In the initial state, all the group print jobs are displayed in the closed state. If a group print job is in the "open" state, print jobs forming this group print job are displayed as well as the group print job (see FIG. 4B). If a group print job is in the "closed" state, only the group print job is displayed as if it were a single print job.

Group print jobs in the open state are shown in the example in FIG. 4B.

Concerning the print job 410 in the example in FIG. 4B, the first row indicates that ID is 10, the print job name is job 10, the status is waiting, the number of print copies is one, and the sending device is undetermined; the second row indicates that ID is 9, the print job name is group job A (four jobs), the status is waiting, the number of print copies is undetermined, and the sending device is undetermined; the third row indicates that ID is 6, the print job name is job 6, the status is waiting, the number of print copies is five, and the sending device is undetermined; the fourth row indicates that ID is 5, the print job name is job 5, the status is waiting, the number of print copies is five, and the sending device is undetermined; the fifth row indicates that ID is 4, the print job name is job 4, the status is waiting, the number of print copies is five, and the sending device is undetermined; the sixth row indicates that ID is 3, the print job name is job 3, the status is waiting, the number of print copies is five, and the sending device is undetermined; the seventh row indicates that ID is 8, the print job name is group job B (three jobs), the status is waiting, the number of print copies is undetermined, and the sending device is undetermined; the eighth row indicates that ID is 7, the print job name is job 7, the status is waiting, the number of print copies is five, and the sending device is undetermined; the ninth row indicates that ID is 11, the print job name is group job C (two jobs), the status is waiting, the number of print copies is undetermined, and the sending device is undetermined; and the tenth row indicates that ID is 1, the print job name is job 1, the status is waiting, the number of print copies is five, and the sending device is undetermined. The third through sixth rows indicate a print job group forming the group print job A, while the eighth and ninth rows indicate a print job group forming the group print job B. A group print job may further include a group print job in a hierarchical manner. The group print job B further includes the group print job C. Forming of hierarchical levels in a group print job may be restricted to a predetermined number (three hierarchical levels, for example).

In the state in FIG. 4B, the jobs may be sorted according to the ID in the ID field 414. In this case, jobs that can be sorted are root print jobs (jobs that are not placed under a group print job, namely, single print jobs and group print jobs). This is because it is not desirable that print jobs forming a group print job are separated from this group print job and are sorted out.

When the detail field 424 of a certain row is selected by a user, the attributes of the print job of the selected row are presented on a property screen (such as a popup screen). In the case of a group print job, the processing result generated by the group print job forming module 110 is presented. That is, the result of integrating the attributes of print jobs forming this group print job is presented.

A subgroup print job is displayed on the screen 400 as a group print job within a group print job.

Figure 5:
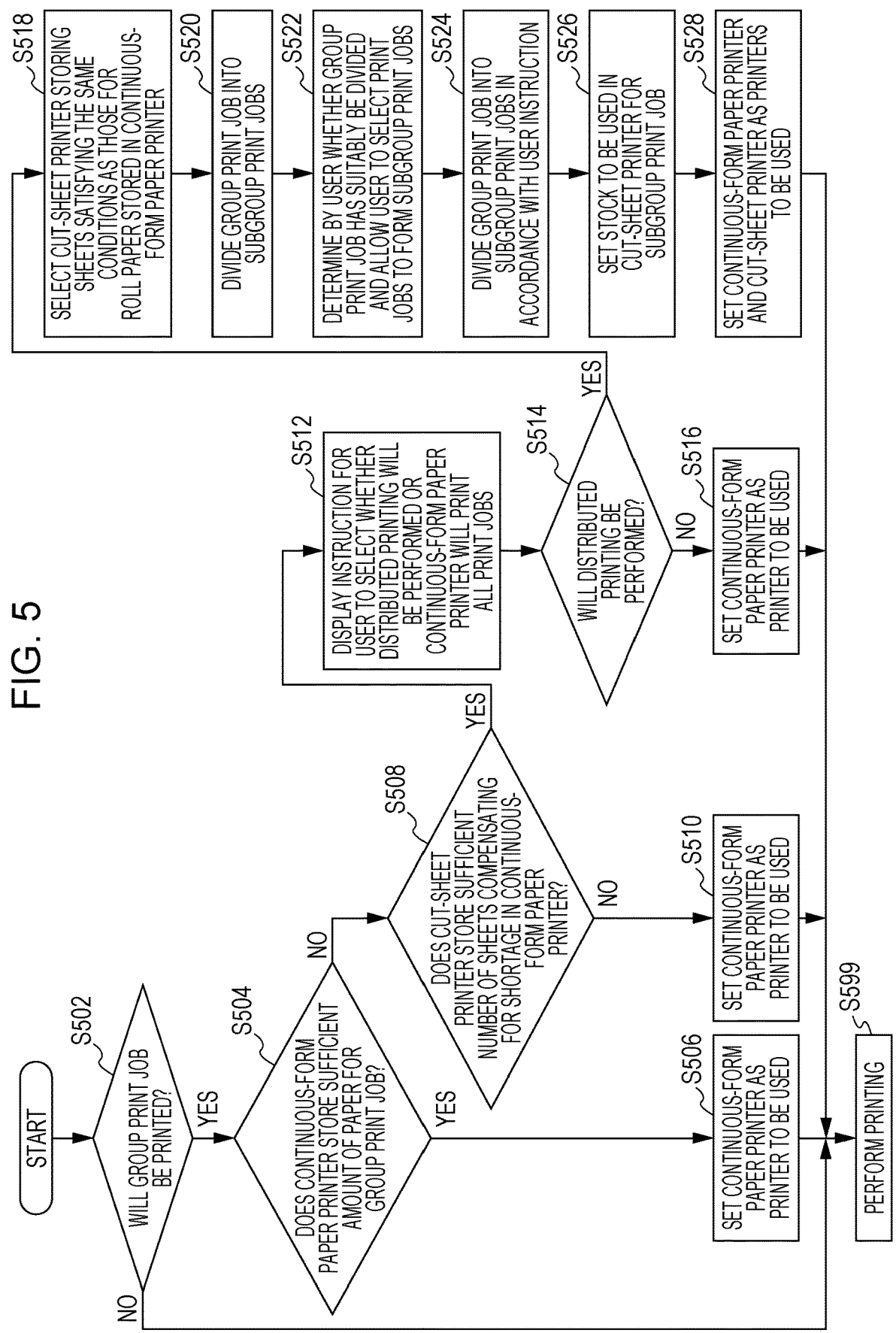
FIG. 5 is a flowchart illustrating an example of processing executed by the exemplary embodiment.

FIG. 5 is a flowchart illustrating an example of processing executed by the exemplary embodiment. In the example of processing in FIG. 5, image forming devices 150 serving as continuous-form paper printers and image forming devices 150 serving as cut-sheet printers are both provided, and a subgroup print job is assigned to a cut-sheet printer.

In step S502, it is judged whether a print job is a group print job. If a print job is a group print job, the process proceeds to step S504. If a print job is not a group print job, that is, if it is a single print job, the process proceeds to step S599. For example, the receiving module 105 receives a group print job table 600 and a print job table 700, which will be discussed later, and makes a judgment in step S502. If the print job is a single print job, the image forming device 150 specified in this print job or a predetermined image forming device 150 may be selected.

In step S504, it is judged whether a continuous-form paper printer (image forming device 150) stores a sufficient amount of paper for printing the group print job. If the continuous-form paper printer stores a sufficient amount of paper, the process proceeds to step S506. If the continuous-form paper printer does not store a sufficient amount of paper, the process proceeds to step S508. In this case, the continuous-form paper printer stores paper (roll paper, for example) that matches the attributes of paper to be used in the group print job. For example, if glossy paper is specified as the attribute of the paper type in the group print job, the continuous-form paper printer that stores a sufficient amount of glossy roll paper for the group print job is selected. If the sheet size described in the group print job is A4, the continuous-form paper printer that stores roll paper that can be cut into the A4 size is selected. For example, the image forming device selecting module 125 selects a continuous-form paper printer that stores a sufficient amount of paper for the group print job by using a printer table 800 and a printer status table 900, which will be discussed later.

In step S506, this continuous-form paper printer is set as a printer to be used. The process then proceeds to step S599. In this case, the continuous-form paper printer prints all the print jobs forming the group print job.

In step S508, it is judged whether the cut-sheet printer stores a sufficient number of sheets which compensates for a shortage in the continuous-form paper printer. If the cut-sheet printer stores a sufficient number of sheets, the process proceeds to step S512. If the cut-sheet printer does not store a sufficient number of sheets, the process proceeds to step S510. For example, the image forming device selecting module 125 selects a cut-sheet printer that stores a sufficient number of sheets which compensates for a shortage in the continuous-form paper printer by using the printer table 800 and the printer status table 900, which will be discussed later.

In step S510, the continuous-form paper printer is set as a printer to be used. The process then proceeds to step S599. In this case, when the continuous-form paper printer runs out of paper during printing, continuous-form paper is reloaded to continue printing.

In step S512, an instruction for a user to select whether part of the group print job will be assigned to a cut-sheet printer (whether distributed printing will be performed) or the continuous-form paper printer will print all the print jobs is displayed. This is equal to determining whether the group print job will be printed by plural image forming devices 150 or a single image forming device 150. The user then selects one of the two options.

In step S514, it is judged whether distributed printing will be performed based on the selection result of the user. If distributed printing is performed, the process proceeds to step S518. If distributed printing is not performed, the process proceeds to step S516.

In step S516, the continuous-form paper printer is set as a printer to be used. The process then proceeds to step S599. In this case, when the continuous-form paper printer runs out of paper during printing, continuous-form paper is reloaded to continue printing.

In step S518, the cut-sheet printer which stores sheets that satisfy the same conditions as those for the roll paper set in the continuous-form paper printer is selected. For example, if glossy roll paper is set in the continuous-form paper printer, the cut-sheet printer (image forming device 150) that stores glossy cut sheets is selected. If the sheet size described in the group print job is A4, the cut-sheet printer (image forming device 150) that stores A4-size cut sheets is selected.

In step S520, the group print job is divided into subgroup print jobs to perform distributed printing.

In step S522, the user determines whether the group print job has suitably been divided. If not, the user selects print jobs so that subgroup print jobs are formed according to the client. The volume of print jobs ordered by each client and the number of sheets stored in each image forming device 150 (cut-sheet printers) may be displayed, and then, the user may be instructed to select an image forming device 150.

In step S524, the group print job is divided into subgroup print jobs to perform distributed printing in accordance with the user instruction provided in step S522.

In step S526, the stock (such as sheets and toner) to be used in the cut-sheet printer for the subgroup print job is set.

In step S528, the continuous-form paper printer and the cut-sheet printer are set as printers to be used. The process then proceeds to step S599.

In step S599, printing is performed. The receiver module 105 may receive the group print job table 600.

Figure 6:
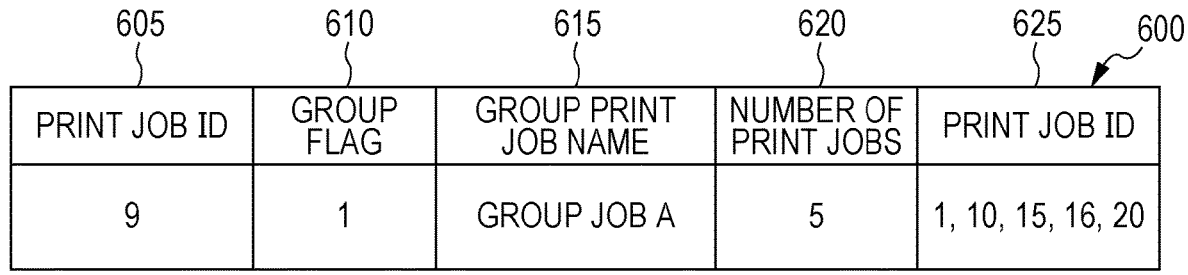
FIG. 6 illustrates an example of the data structure of a group print job table.

FIG. 6 illustrates an example of the data structure of the group print job table 600. The group print job table 600 has a print job ID field 605, a group flag field 610, a group print job name field 615, a number-of-print-jobs field 620, and a print job ID field 625. The print job ID field 605 stores information (print job ID) for uniquely identifying a print job or a group print job in the exemplary embodiment. The group flag field 610 stores information (group flag) whether the print job is a group print job. The group print job name field 615 indicates the name of the group print job. The number-of-print-jobs field 620 indicates the number of print jobs included in the group print job. The print job ID field 625 indicates the print job IDs of the print jobs included in the group print job. Plural print job IDs are indicated in the print job ID field 625.

As a result of checking the group flag field 610, step S502 of FIG. 5 is executed.

Concerning the group print job shown in FIG. 6, the print job ID is 9, the group flag is 1 (print job is a group print job), the group print job name is group job A, the number of print jobs is five, and the print job IDs of the print jobs forming the group print job are 1, 10, 15, 16, and 20.

The receiver module 105 may receive the print job table 700.

Figure 7:
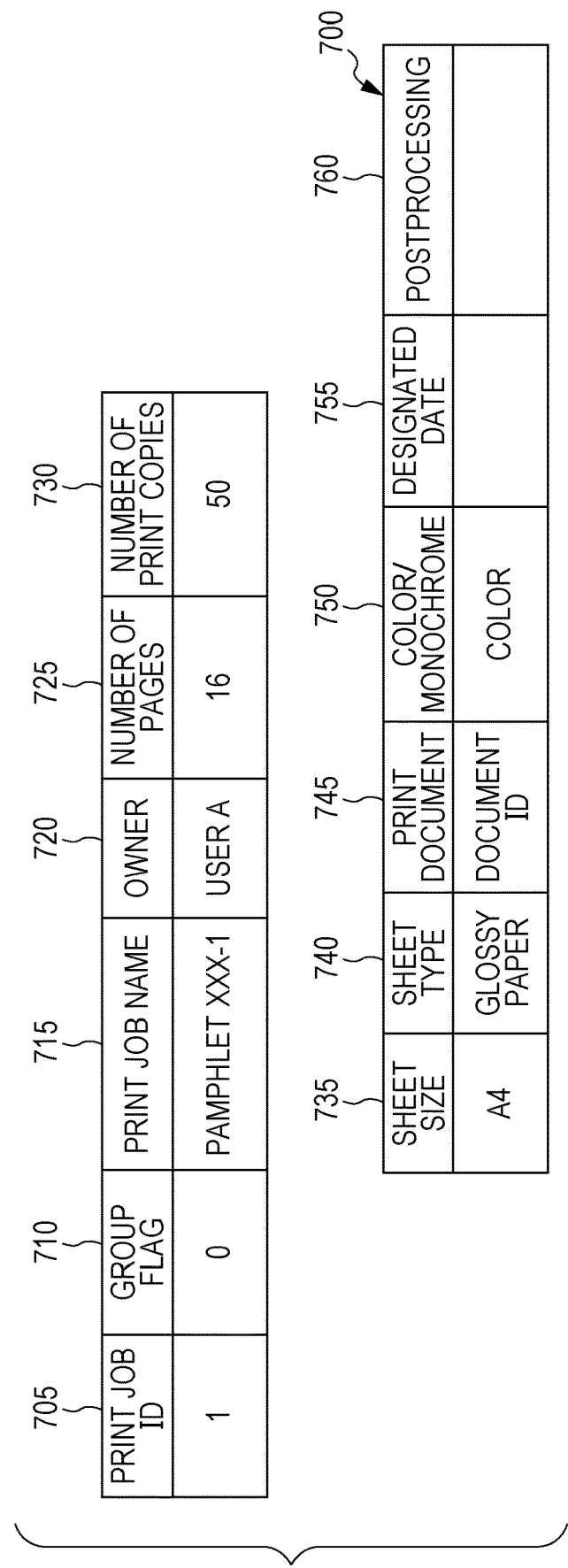
FIG. 7 illustrates an example of the data structure of a print job table.

FIG. 7 illustrates an example of the data structure of the print job table 700. The print job table 700 has a print job ID field 705, a group flag field 710, a print job name field 715, an owner field 720, a number-of-pages field 725, a number-of-print-copies field 730, a sheet size field 735, a sheet type field 740, a print document field 745, a color/monochrome field 750, a designated date field 755, and a postprocessing field 760. The print job ID field 705 stores a print job ID of a print job. The group flag field 710 stores information (group flag) whether the print job is a group print job. The print job name field 715 indicates the name of the print job. The owner field 720 indicates the owner (end user) of the print job (owner of the final processing result, that is, printed matter). The number-of-pages field 725 indicates the number of pages of a print document in the print job. The number-of-print-copies field 730 indicates the number of print copies required in the print job. The sheet size field 735 indicates the sheet size to be used in the print job. The sheet type field 740 indicates the sheet type to be used in the print job. The print document field 745 stores or indicates a print document in the print job. The print document field 745 may store the print document itself or may indicate the location where the print document is stored (such as a document ID, a document name, and a uniform resource locator (URL)). The color/monochrome field 750 stores information whether the print job concerns color printing or monochrome printing. In the color/monochrome field 750, not only information whether color printing or monochrome printing is performed, but also information whether printing using a spot color (gold, silver, and fluorescent colors) is performed may also be described. The designated date field 755 indicates the designated date and time on and at which the print job is executed. The postprocessing field 760 indicates postprocessing (such as stapling, punching, and bookbinding) to be performed in the print job.

As a result of checking the group flag field 710, step S502 of FIG. 5 is executed.

Concerning the print job shown in FIG. 7, the print job ID is 1, the group flag is 0 (print job is a single print job), the print job name is pamphlet XX-1, the owner (client) is user A, the number of pages is 16, the number of print copies is 50, the sheet size is A4, the sheet type is glossy paper, and so on.

Figure 8:
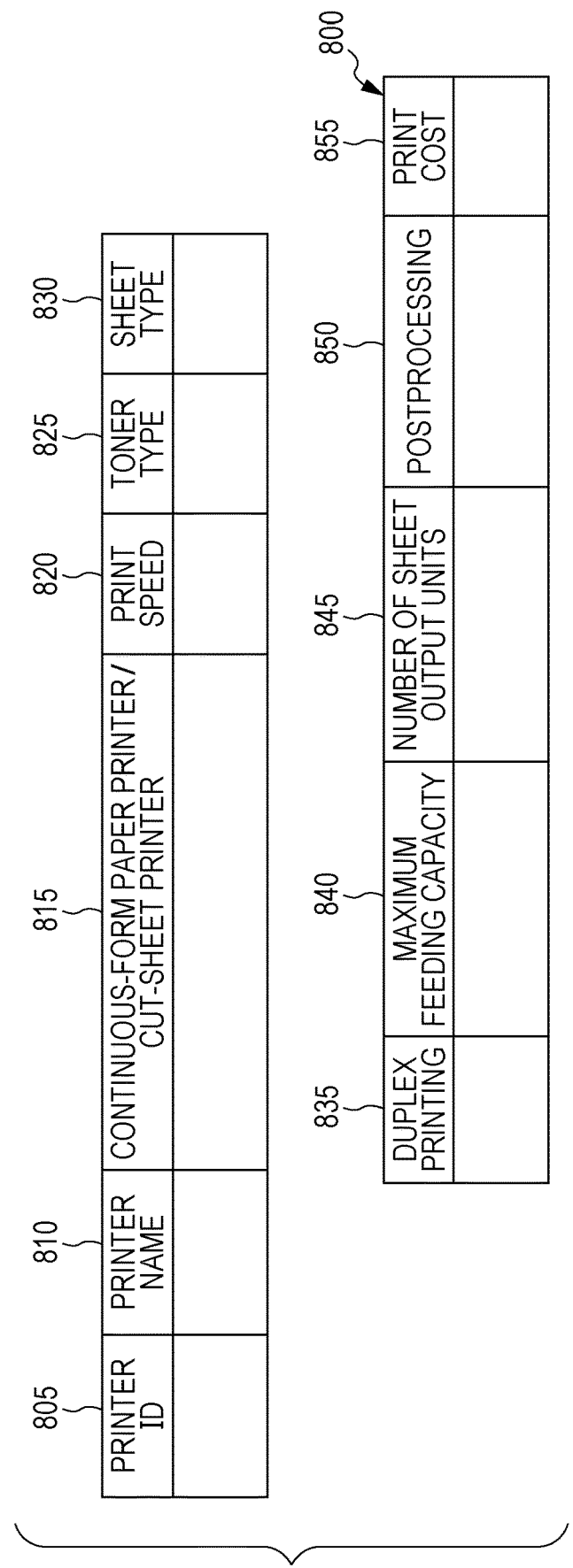
FIG. 8 illustrates an example of the data structure of a printer table.

FIG. 8 illustrates an example of the data structure of the printer table 800. The printer table 800 has a printer ID field 805, a printer name field 810, a continuous-form-paper-printer/cut-sheet-printer field 815, a print speed field 820, a toner type field 825, a sheet type field 830, a duplex printing field 835, a maximum feeding capacity field 840, a number-of-sheet-output-units field 845, a postprocessing field 850, and a print cost field 855. The printer ID field 805 stores information (printer ID) for uniquely identifying a printer in the exemplary embodiment. The printer name field 810 indicates the name of the printer. The continuous-form-paper-printer/cut-sheet-printer field 815 stores information (flag) indicating whether the printer is a continuous-form paper printer or a cut-sheet printer. The print speed field 820 indicates the print speed of the printer. Plural print speed fields may be provided in accordance with plural sheet types (such as A4 size and A3 size). The toner type field 825 indicates toner types that can be stored in the printer, such as the types of color toners (black, cyan, magenta, yellow, and spot color toners). The sheet type field 830 indicates sheet types that can be stored in the printer. The duplex printing field 835 stores information whether the printer is able to perform duplex printing. The maximum feeding capacity field 840 indicates the maximum feeding capacity of the printer. The number-of-sheet-output-units field 845 indicates the number of sheet output units provided in the printer. The number-of-sheet-output-units field 845 may also indicate the capacity of each of the sheet output units (such as the number of output sheets that can be received by an output sheet receiver). The postprocessing field 850 indicates postprocessing functions of the printer. The print cost field 855 indicates the print cost of the printer.

If plural printers are available to print a group print job, a printer that can print more quickly (print speed is faster) or a printer that incurs the less print cost may be selected.

Figure 9:
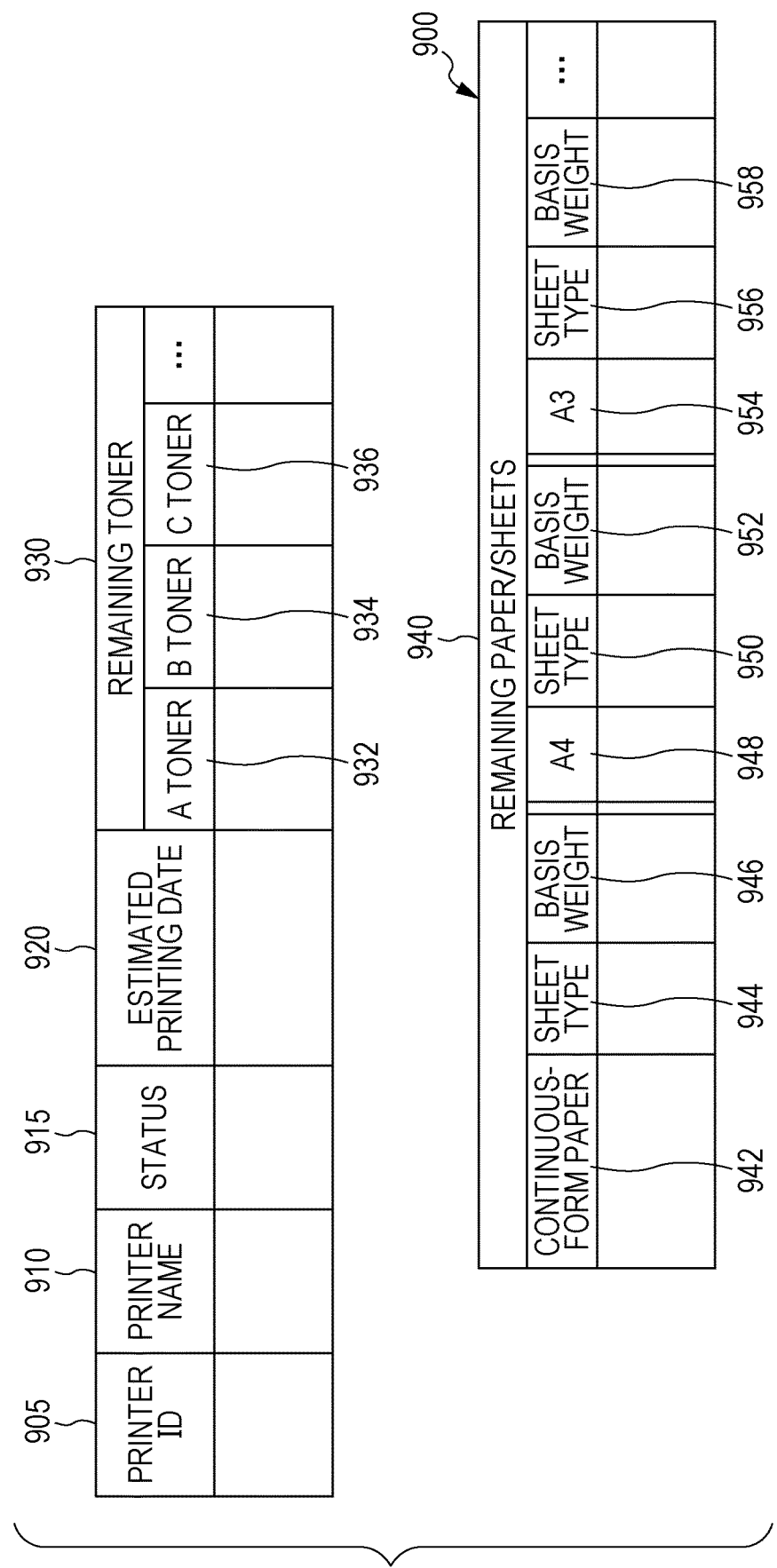
FIG. 9 illustrates an example of the data structure of a printer status table.

FIG. 9 illustrates an example of the data structure of the printer status table 900. The printer status table 900 has a printer ID field 905, a printer name field 910, a status field 915, an estimated printing date field 920, a remaining toner field 930, and a remaining paper/sheet field 940. The remaining toner field 930 has an A toner field 932, a B toner field 934, a C toner field 936, and so on. The remaining paper/sheet field 940 has a continuous-form paper field 942, a sheet type field 944, a basis weight field 946, an A4 field 948, a sheet type field 950, a basis weight field 952, an A3 field 954, a sheet type field 956, and a basis weight field 958. The printer ID field 905 stores the printer ID of a printer. The printer name field 910 indicates the name of the printer. The status field 915 indicates the status of the printer (such as printing, waiting, or not functioning). The estimated printing date field 920 indicates the date and time on and at which the printer becomes available for printing. For example, if the printer is printing, the end date and time on and at which the printer will finish printing is indicated, and if the next print job is scheduled for this printer, the end date and time on and at which the printer will finish printing all print jobs is indicated. The end date and time may be estimated from the number of print pages and print speed. The remaining toner field 930 indicates the current amount of toner in the printer. The A toner field 932 indicates the remaining amount of A toner. The B toner field 934 indicates the remaining amount of B toner. The C toner field 936 indicates the remaining amount of C toner. In addition to the remaining toner fields for black, cyan, magenta, and yellow toners, the remaining toner field 930 may include remaining toner fields for spot color toners supported by the printer. The remaining paper/sheet field 940 indicates the currently remaining amount of paper or remaining sheets in the printer. The continuous-form paper field 942 indicates the remaining amount of continuous-form paper. The sheet type field 944 indicates the sheet type of continuous-form paper. The basis weight field 946 indicates the basis weight of the continuous-form paper. The A4 field 948 indicates the remaining A4 sheets. The sheet type field 950 indicates the type of A4 sheets. The basis weight field 952 indicates the basis weight of A4 sheets. The A3 field 954 indicates the remaining A3 sheets. The sheet type field 956 indicates the type of A3 sheets. The basis weight field 958 indicates the basis weight of A3 sheets.

The printer status table 900 may have a color correction status (also called color management system (CMS) correction) field. After a printer has printed many pages, the printing result may become nonuniform, and color correction is required for the printer to prevent the occurrence of print nonuniformity. The color correction status is a parameter (such as the remaining period and the remaining pages) before color correction is required. A printer which is able to finish printing before it requires color correction may be selected. That is, a printer which does not require color correction while printing a group print job is selected.

Figure 10:
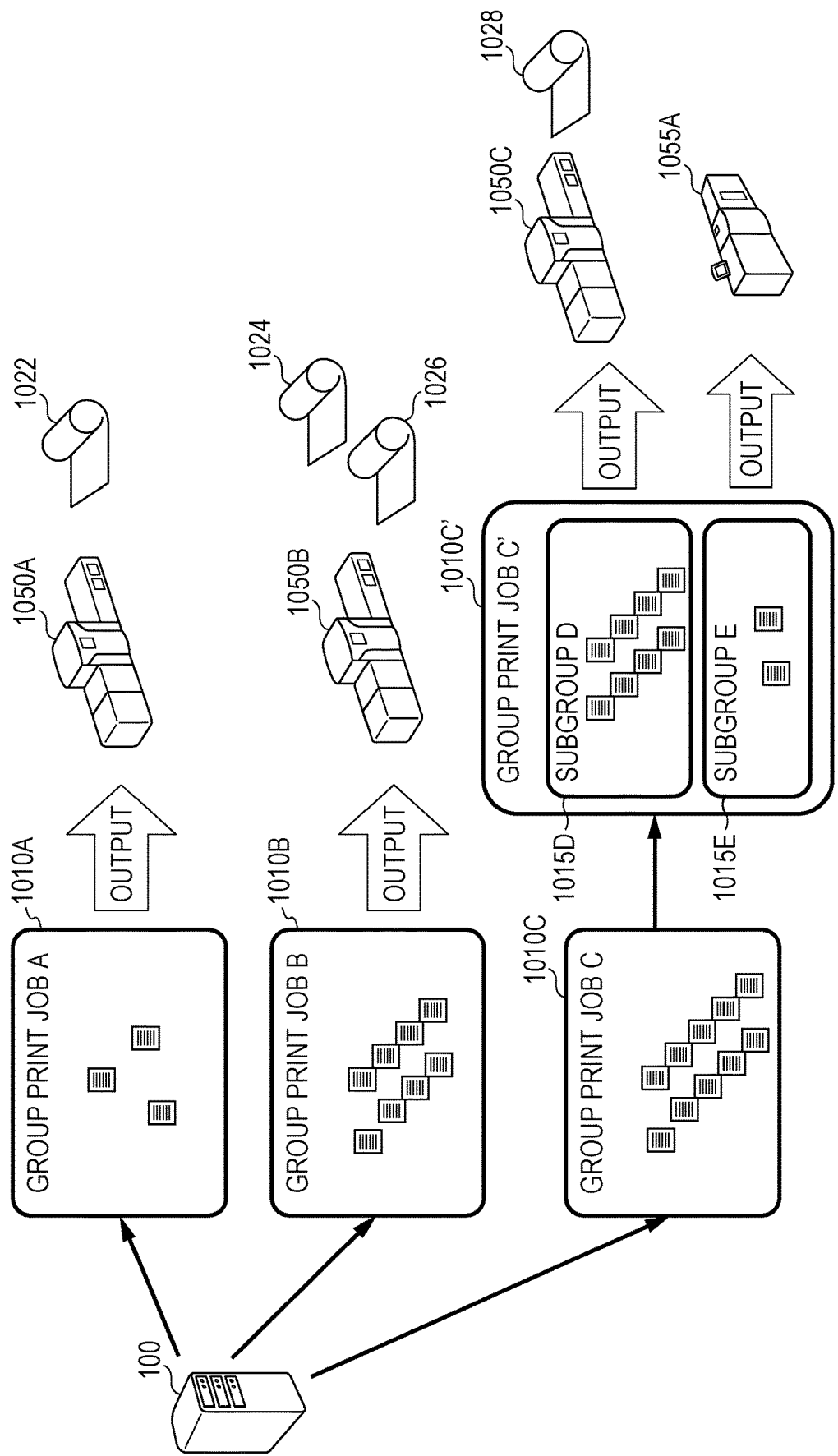
FIG. 10 illustrates an example of processing executed by the exemplary embodiment.

FIG. 10 illustrates an example of processing executed by the exemplary embodiment. Continuous-form paper printers 1050 and a cut-sheet printer 1055 are specific examples of the image forming devices 150. The information processing apparatus 100 selects a continuous-form paper printer 1050A for a group print job A 1010A and selects a continuous-form paper printer 1050B for a group print job B 1010B. The information processing apparatus 100 divides a group print job C 1010C into a subgroup D 1015D and a subgroup E 1015E, and selects a continuous-form paper printer 1050C for the subgroup D 1015D and a cut-sheet printer 1055A for the subgroup E 1015E.

The group print job A 1010A includes three print jobs. Roll paper 1022 is set in the continuous-form paper printer 1050A.

The required amount of paper for the group print job A 1010A is covered by the resources (remaining amount of roll paper 1022) of the continuous-form paper printer 1050A. The continuous-form paper printer 1050A is able to finish printing as required by the group print job A 1010A. This state is an example of the case in which the result of step S504 in the flowchart of FIG. 5 is YES.

The group print job B 1010B includes eight print jobs. Roll paper 1024 is set in the continuous-form paper printer 1050B. Roll paper 1026 is available as spare paper and is not yet set in the continuous-form paper printer 1050B.

The resources (remaining amount of roll paper 1024) of the continuous-form paper printer 1050B are not sufficient for the required amount of paper for the group print job B 1010B. After the continuous-form paper printer 1050B runs out of roll paper 1024, the spare roll paper 1026 is required to be set. This state is an example of the case in which the result of step S508 or step S514 in the flowchart of FIG. 5 is NO.

The group print job C 1010C includes ten print jobs. A group print job C' 1010C' includes the subgroup D 1015D and the subgroup E 1015E. The subgroup D 1015D includes eight print jobs, and the subgroup E 1015E includes two print jobs. Roll paper 1028 is set in the continuous-form paper printer 1050C. The group print job C 1010C is divided into the subgroup D 1015D and the subgroup E 1015E in accordance with the remaining amount of roll paper 1028. That is, the required amount of paper for printing the subgroup D 1015D can be covered by the remaining amount of roll paper 1028. In the cut-sheet printer 1055A, cut sheets sufficient for printing the subgroup E 1015E are set. The type of cut sheets is the same as that of roll paper 1028. For example, if the roll paper 1028 is coated paper (glossy paper) and the basis weight is 100 grams per square meter (gsm), the cut-sheet printer 1055A stores coated cut sheets having a basis weight of 100 gsm.

Figure 11:
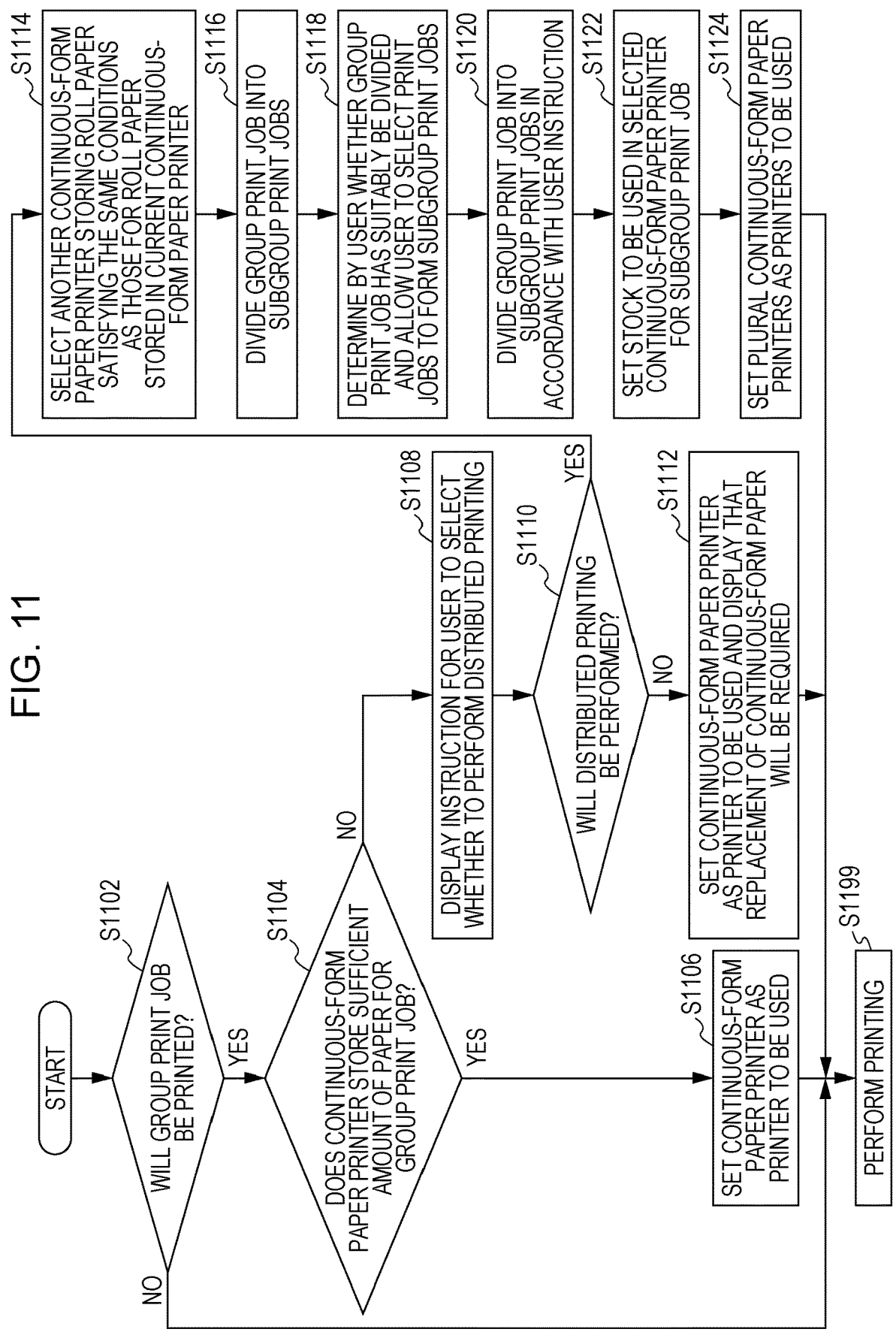
FIG. 11 is a flowchart illustrating an example of processing executed by the exemplary embodiment.

FIG. 11 is a flowchart illustrating an example of processing executed by the exemplary embodiment. In the example of processing in FIG. 11, plural image forming devices 150 serving as continuous-form paper printers are provided, and a subgroup print job is assigned to one of the continuous-form paper printers.

In step S1102, it is judged whether a print job is a group print job. If a print job is a group print job, the process proceeds to step S1104. If a print job is not a group print job, the process proceeds to step S1199. For example, the receiving module 105 receives the above-described group print job table 600 and print job table 700 and makes a judgment in step S1102. If the print job is a single print job, the image forming device 150 specified in this print job or a predetermined image forming device 150 may be selected.

In step S1104, it is judged whether a continuous-form paper printer stores a sufficient amount of paper for printing the group print job. If the continuous-form paper printer stores a sufficient amount of paper, the process proceeds to step S1106. If the continuous-form paper printer does not store a sufficient amount of paper, the process proceeds to step S1108. In this case, the continuous-form paper printer stores paper (roll paper, for example) that matches the attributes of paper to be used in the group print job. Step S1108 is similar to step S504 in FIG. 5.

In step S1106, the continuous-form paper printer is set as a printer to be used. The process then proceeds to step S1199. In this case, the continuous-form paper printer prints all the print jobs forming the group print job.

In step S1108, an instruction for a user to select whether to perform distributed printing is displayed. This is equal to determining whether the group print job will be printed by plural image forming devices 150 or a single image forming device 150. The user then selects one of the two options.

In step S1110, it is judged whether distributed printing will be performed based on the selection result of the user. If distributed printing is performed, the process proceeds to step S1114. If distributed printing is not performed, the process proceeds to step S1112.

In step S1112, the continuous-form paper printer is set as a printer to be used, and a message that replacement of roll paper will be required is displayed. The process then proceeds to step S1199. In this case, when the continuous-form paper printer runs out of paper during printing, spare continuous-form paper is reloaded to continue printing.

In step S1114, another continuous-form paper printer which stores roll paper that satisfies the same conditions as those for roll paper set in the current continuous-form paper printer is selected. For example, if glossy roll paper is set in the current continuous-form paper printer, another continuous-form paper printer that stores glossy roll paper is selected. If the sheet size described in the group print job is A4, the continuous-form paper printer (image forming device 150) that stores roll paper which can be cut into the A4 size is selected.

In step S1116, the group print job is divided into subgroup print jobs to perform distributed printing.

In step S1118, the user determines whether the group print job has suitably been divided. If not, the user selects print jobs so that subgroup print jobs are formed according to the client. The volume of print jobs ordered by each client and the amount of paper stored in each image forming device 150 (continuous-form paper printer) may be displayed, and then, the user may be instructed to select an image forming device 150.

In step S1120, the group print job is divided into subgroup print jobs to perform distributed printing in accordance with the user instruction provided in step S1118.

In step S1122, the stock (such as paper and toner) to be used in the selected continuous-form paper printer for the subgroup print job is set.

In step S1124, the plural continuous-form paper printers are set as printers to be used. The process then proceeds to step S1199.

In step S1199, printing is performed.

Figure 12:
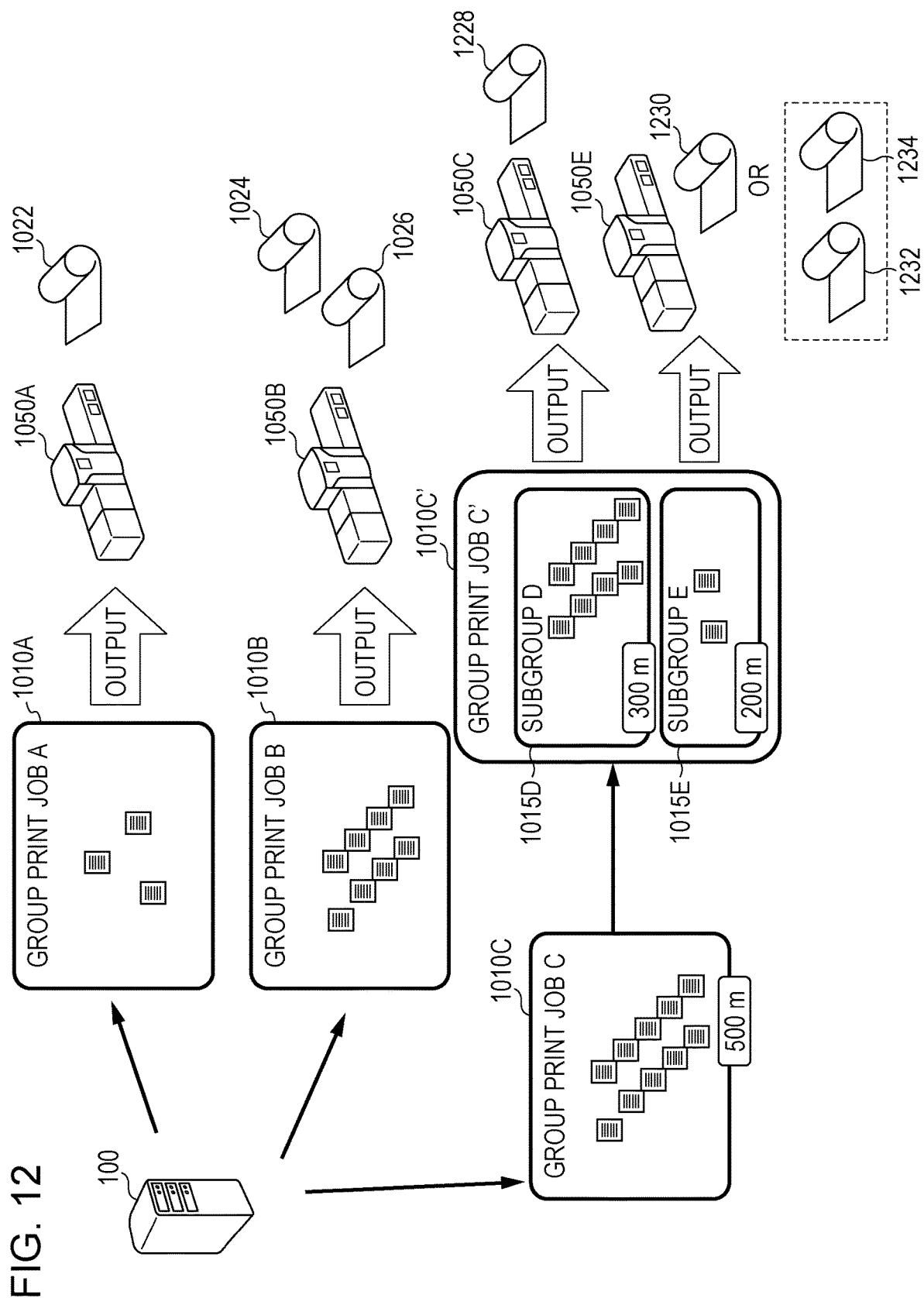
FIG. 12 illustrates an example of processing executed by the exemplary embodiment.

FIG. 12 illustrates an example of processing executed by the exemplary embodiment. Continuous-form paper printers 1050 are specific examples of the image forming devices 150. The information processing apparatus 100 selects a continuous-form paper printer 1050A for a group print job A 1010A and selects a continuous-form paper printer 1050B for a group print job B 1010B. The information processing apparatus 100 divides a group print job C 1010C into a subgroup D 1015D and a subgroup E 1015E, and selects a continuous-form paper printer 1050C for the subgroup 1015D and a continuous-form paper printer 1050E for the subgroup E 1015E.

The group print job A 1010A and the group print job B 1010B are processed in a manner similar to those in FIG. 10. The state of the continuous-form paper printer 1050A when processing the group print job A 1010A is an example of the case in which the result of step S1104 in the flowchart of FIG. 11 is YES.

The state of the continuous-form paper printer 1050B when processing the group print job B 1010B is an example of the case in which the result of step S1110 in the flowchart of FIG. 11 is NO. When the continuous-form paper printer 1050B is selected for printing a group print job, suitable roll paper is selected from a registered roll paper list. More specifically, the amount of roll paper 1024 set in the continuous-form paper printer 1050B is not sufficient for printing the group print job B 1010B, and roll paper 1026 which can compensate for a shortage is selected. The total amount of roll paper 1024 and roll paper 1026 covers the required amount of paper for printing the group print job B 1010B. An inventory of pieces of roll paper which are not set in a continuous-form paper printer is registered, and a suitable piece of roll paper, such as the roll paper 1026, is selected from the inventory. More specifically, an ID (identification information) is assigned to each piece of roll paper, and a roll paper table in which the roll paper ID and the remaining amount of paper are associated with each other is stored. Then, plural pieces of roll paper that cover the total amount (length) of paper required for printing a group print job are selected and set before starting printing.

The remaining amount of roll paper in the image forming device 150 may be managed in the following manner.

After the image forming device 150 has printed a print job, a barcode representing the paper ID and the remaining amount of roll paper is printed at the end of the roll paper.

When setting roll paper in the image forming device 150, the amount of roll paper is read with a barcode reader and is set in the image forming device 150 as remaining paper amount information.

The barcodes of individual pieces of roll paper are read with a barcode reader and are stored as a list of pieces of roll paper in the information processing apparatus 100.

The example in FIG. 12 will be discussed more specifically. The required amount (length) of paper for printing the group print job C 1010C is 500 m. The length of roll paper 1228 set in the continuous-form paper printer 1050C is 300 m, and that of roll paper 1230 set in the continuous-form paper printer 1050E is 200 m. In accordance with the remaining amount of roll paper 1228, the group print job C 1010C is divided into a subgroup D 1015D and a subgroup E 1015E. The required amount (300 m) of roll paper for printing the subgroup D 1015D is equal to or less than the amount of roll paper 1228. In the continuous-form paper printer 1050E, the amount of paper greater than or equal to that for printing the subgroup E 1015E is set. The type of paper set in the continuous-form paper printer 1050E is the same as the roll paper 1228 set in the continuous-form paper printer 1050C. For example, if the roll paper 1228 is coated paper having a basis weight of 100 gsm, the selected continuous-form paper printer 1050E stores roll paper 1230 which is coated paper having a basis weight of 100 gsm and having a length of 200 m or longer. If a certain continuous-form paper printer 1050 is unable to cover a required amount of paper for printing a subgroup print job with one piece of roll paper, but is able to cover the required amount with plural pieces of roll paper, it may be selected. For example, if the continuous-form paper printer 1050E stores roll paper 1232 and roll paper 1234 which are each coated paper having a basis weight of 100 gsm and having a length of 100 m or longer, it may be selected.

An example of the hardware configuration of the information processing apparatus 100 of the exemplary embodiment will be described below with reference to FIG. 13. The hardware configuration shown in FIG. 13 is implemented as a personal computer (PC), for example, and includes a data reader 1317, such as a scanner, and a data output unit 1318, such as a printer.

A CPU 1301 is a control unit that executes processing in accordance with a computer program describing an execution sequence of the modules of the above-described exemplary embodiment, that is, the receiving module 105, the group print job forming module 110, the image forming device selecting module 125, and the image forming device communication module 135.

A read only memory (ROM) 1302 stores programs and operation parameters used by the CPU 1301. A RAM 1303 stores programs used during the execution of the CPU 1301 and parameters which change appropriately during the execution of the programs. The CPU 1301, the ROM 1302, and the RAM 1303 are connected to one another via a host bus 1304, which is constituted by, for example, a CPU bus.

The host bus 1304 is connected to an external bus 1306, such as a peripheral component interconnect/interface (PCI) bus, via a bridge 1305.

A keyboard 1308 and a pointing device 1309, such as a mouse, are devices operated by an operator. A display 1310 is, for example, a liquid crystal display or a cathode ray tube (CRT), and displays various items of information as text or image information. Alternatively, a touchscreen having both of the functions of the pointing device 1309 and the display 1310 may be provided. In this case, to implement the function of the keyboard, a keyboard drawn on a screen (touchscreen) by using software, that is, a software keyboard or a screen keyboard, may be used instead of the keyboard 1308, which is a physical keyboard.

A hard disk drive (HDD) 1311 has a built-in hard disk (may alternatively be a flash memory, for example) and drives the hard disk so as to record or play back information or programs executed by the CPU 1301. The HDD 1311 implements the function of the print job storage module 120, for example. Various other items of data and various other computer programs are also stored in the HDD 1311.

A drive 1312 reads data or a program recorded in a removable recording medium 1313, such as a magnetic disk, an optical disc, a magneto-optical disk, or a semiconductor memory, and supplies the read data or program to the RAM 1303 via an interface 1307, the external bus 1306, the bridge 1305, and the host bus 1304. The removable recording medium 1313 is also usable as a data recording region.

A connecting port 1314 is a port for connecting the PC to an external connecting device 1315, and has a connecting portion, such as a universal serial bus (USB) port or an IEEE1394 port. The connecting port 1314 is connected to, for example, the CPU 1301, via the interface 1307, the external bus 1306, the bridge 1305, and the host bus 1304. A communication unit 1316 is connected to a communication line and executes data communication processing with an external source. The data reader 1317 is, for example, a scanner, and executes processing for reading documents. The data output unit 1318 is, for example, a printer, and executes processing for outputting document data.

The hardware configuration of the information processing apparatus 100 shown in FIG. 13 is only an example, and the exemplary embodiment may be configured in any manner in which the modules described in the exemplary embodiment are executable. For example, some modules may be configured as dedicated hardware (for example, an application specific integrated circuit (ASIC)), or some modules may be installed in an external system and be connected to the PC via a communication line. A system, such as that shown in FIG. 13, may be connected to a system, such as that shown in FIG. 13, via a communication line, and may be operated in cooperation with each other. Additionally, instead of into a PC, the modules may be integrated into a mobile information communication device (including a cellular phone, a smartphone, a mobile device, and a wearable computer), a home information appliance, a robot, a copying machine, a fax machine, a scanner, a printer, and a multifunction device (image processing device including at least two functions among a scanner, a printer, a copying machine, and a fax machine).

The above-described program may be stored in a recording medium and be provided. The program recorded on a recording medium may be provided via a communication medium. In this case, the above-described program may be implemented as a "non-transitory computer readable medium storing the program therein" in the exemplary embodiment.

The "non-transitory computer readable medium storing a program therein" is a recording medium storing a program therein that can be read by a computer, and is used for installing, executing, and distributing the program.

Examples of the recording medium are digital versatile disks (DVDs), and more specifically, DVDs standardized by the DVD Forum, such as DVD-R, DVD-RW, and DVD-RAM, DVDs standardized by the DVD+RW Alliance, such as DVD+R and DVD+RW, compact discs (CDs), and more specifically, a CD read only memory (CD-ROM), a CD recordable (CD-R), and a CD rewritable (CD-RW), Blu-ray (registered trademark) disc, a magneto-optical disk (MO), a flexible disk (FD), magnetic tape, a hard disk, a ROM, an electrically erasable programmable read only memory (EEPROM) (registered trademark), a flash memory, a RAM, a secure digital (SD) memory card, etc.

The entirety or part of the above-described program may be recorded on such a recording medium and stored therein or distributed. Alternatively, the entirety or part of the program may be transmitted through communication by using a transmission medium, such as a wired network used for a local area network (LAN), a metropolitan area network (MAN), a wide area network (WAN), the Internet, an intranet, or an extranet, a wireless communication network, or a combination of such networks. The program may be transmitted by using carrier waves.

The above-described program may be the entirety or part of another program, or may be recorded, together with another program, on a recording medium. The program may be divided and recorded on plural recording media. The program may be recorded in any form, for example, it may be compressed or encrypted, as long as it can be reconstructed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a storage; and
a processor programmed to:
receive print jobs and form a group print job constituted by print jobs that satisfy a certain condition for being printed and contained within specified continuous-form paper;
determine whether an amount of paper required for the group print job exceeds a total amount of the specified continuous-form paper;
upon determining that the amount of paper required for the group print job exceeds the total amount of the specified continuous-form paper, separately store, in the storage, some of the print jobs forming the group print job as a subgroup; and
select, based on information stored in the storage, an output device storing a sufficient number of cut sheets to compensate for a shortage in the specified continuous-form paper, thereby being configured to output the cut sheets which satisfy an execution condition for executing the print jobs forming the subgroup, from among a plurality of output devices.

2. The information processing apparatus according to claim 1, wherein the storage stores some of the print jobs forming the group print job as a subgroup in accordance with an attribute of cut sheets that an output device for outputting cut sheets is configured to output.

3. The information processing apparatus according to claim 2, wherein the processor is programmed to select an output device that has cut sheets satisfying the execution condition loaded.

4. An information processing apparatus comprising:
   a storage; and
   a processor programmed to:
   receive print jobs and form a group print job constituted by print jobs that satisfy a certain condition for being printed and contained within specified continuous-form paper;
   determine whether an amount of paper required for the group print job exceeds a total amount of the specified continuous-form paper;
   upon determining that the amount of paper required for the group print job exceeds the total amount of the specified continuous-form paper, separately store, in the storage, some of the print jobs forming the group print job as a subgroup; and
   select, based on information stored in the storage, an output device storing a sufficient amount of continuous-form paper to compensate for a shortage in the specified continuous-form paper, thereby being configured to output the continuous-form paper which satisfies an execution condition for executing the print jobs forming the subgroup, from among a plurality of output devices.

5. The information processing apparatus according to claim 4, wherein the storage stores some of the print jobs forming the group print job as a subgroup in accordance with a remaining amount of continuous-form paper stored in an output device.

6. The information processing apparatus according to claim 5, wherein the processor is programmed to preferentially select, as the output device, an output device that satisfies conditions that an amount of continuous-form paper stored in the output device is greater than or equal to the remaining amount of continuous-form paper and that a difference between the stored amount of continuous-form paper and the remaining amount of continuous-form paper is smaller than or equal to a threshold.

7. The information processing apparatus according to claim 6, wherein, if the processor is unable to preferentially select an output device, the processor is programmed to display a volume of a print job ordered by each client and an amount of paper stored in each of the plurality of the output devices and instructs a user to select an output device.

8. A non-transitory computer readable medium storing a program causing a computer to execute a process, the process comprising:
   receiving print jobs and forming a group print job constituted by print jobs that satisfy a certain condition for being printed and contained within specified continuous-form paper;
   determining whether an amount of paper required for the group print job exceeds a total amount of the specified continuous-form paper;
   upon determining that the amount of paper required for the group print job exceeds the total amount of the specified continuous-form paper, separately storing some of the print jobs forming the group print job as a subgroup; and
   selecting, based on stored information, an output device storing a sufficient number of cut sheets to compensate for a shortage in the specified continuous-form paper, thereby being configured to output the cut sheets which satisfy an execution condition for executing the print jobs forming the subgroup, from among a plurality of output devices.

\* \* \* \* \*